US011128352B2

(12) United States Patent
Lorca Hernando et al.

(10) Patent No.: US 11,128,352 B2
(45) Date of Patent: Sep. 21, 2021

(54) METHOD AND A SYSTEM FOR DYNAMIC ASSOCIATION OF SPATIAL LAYERS TO BEAMS IN MILLIMETER-WAVE FIXED WIRELESS ACCESS NETWORKS

(71) Applicant: Telefonica, S.A., Madrid (ES)

(72) Inventors: Javier Lorca Hernando, Madrid (ES); Elena Serna Santiago, Madrid (ES)

(73) Assignee: Telefonica, S.A., Madrid (ES)

( * ) Notice: Subject to any disclaimer, the term of this patent is extended or adjusted under 35 U.S.C. 154(b) by 0 days.

(21) Appl. No.: 16/597,641

(22) Filed: Oct. 9, 2019

(65) Prior Publication Data
US 2020/0119776 A1 Apr. 16, 2020

(30) Foreign Application Priority Data

Oct. 10, 2018 (EP) ..................................... 18382719

(51) Int. Cl.
*H04B 7/0408* (2017.01)
*H04B 7/0413* (2017.01)
*H04B 7/06* (2006.01)
*H04W 28/06* (2009.01)
(Continued)

(52) U.S. Cl.
CPC ......... *H04B 7/0408* (2013.01); *H04B 7/0413* (2013.01); *H04B 7/0602* (2013.01); *H04B 7/0617* (2013.01); *H04W 28/06* (2013.01); *H04W 72/046* (2013.01); *H04W 72/12* (2013.01)

(58) Field of Classification Search
None
See application file for complete search history.

(56) References Cited

U.S. PATENT DOCUMENTS

| 10,091,662 B1 * | 10/2018 | Bendlin ................. H04W 24/02 |
| 2014/0003240 A1 | 1/2014 | Chen et al. |
| 2016/0261326 A1 | 9/2016 | Barker |

(Continued)

FOREIGN PATENT DOCUMENTS

| WO | 2014/206461 A1 | 12/2014 |
| WO | 2016/005003 A1 | 1/2016 |

OTHER PUBLICATIONS

European Search Report for EP 18 38 2719 filed Apr. 16, 2019.
Written Opinion for EP 18 38 2719 filed Apr. 16, 2019.

*Primary Examiner* — Anh Vu H Ly
(74) *Attorney, Agent, or Firm* — Sughrue Mion, PLLC

(57) ABSTRACT

Method and system to dynamically associate spatial layers to beams in a FWA network operating in the millimeter-wave frequency range. A base station and a CPE are willing to wirelessly transmit and receive data through a wireless channel of the FWA network, the base station having beam-forming capabilities henceforth generating multiple wireless beams. The base station performs all baseband wireless functions related for creating, keeping and managing the connections between the base station and the CPE at base-band level, wherein information is handled in the form of up to M spatial layer signals, and with no built-in capabilities for creation, detection or management of the beams. The base station also performs all necessary RF functions at millimeter-wave frequencies, including beamforming and conversion from complex baseband signals to RF signals and vice versa, and also couples the RF signals to the wireless channel.

13 Claims, 14 Drawing Sheets

(51) Int. Cl.
*H04W 72/04* (2009.01)
*H04W 72/12* (2009.01)

(56) References Cited

U.S. PATENT DOCUMENTS

| | | | | |
|---|---|---|---|---|
| 2016/0360361 | A1* | 12/2016 | Ross | H04W 24/08 |
| 2017/0127296 | A1* | 5/2017 | Gustafsson | H04W 16/28 |
| 2018/0063693 | A1* | 3/2018 | Chakraborty | H04W 8/005 |
| 2019/0052378 | A1* | 2/2019 | Yiu | H04B 17/309 |
| 2019/0199457 | A1* | 6/2019 | Chopra | H04B 17/318 |
| 2019/0239233 | A1* | 8/2019 | Ryu | H01Q 3/005 |
| 2019/0281587 | A1* | 9/2019 | Zhang | H04L 5/0044 |
| 2019/0281588 | A1* | 9/2019 | Zhang | H04W 52/08 |
| 2019/0297603 | A1* | 9/2019 | Guo | H04L 5/0051 |
| 2020/0022000 | A1* | 1/2020 | Venugopal | H04B 7/0617 |
| 2020/0252143 | A1* | 8/2020 | Liu | H04B 7/0413 |
| 2020/0280409 | A1* | 9/2020 | Grant | H04L 5/0023 |

\* cited by examiner

METHOD AND A SYSTEM FOR DYNAMIC ASSOCIATION OF SPATIAL LAYERS TO BEAMS IN MILLIMETER-WAVE FIXED WIRELESS ACCESS NETWORKS

TECHNICAL FIELD

The present invention is directed, in general, to the field of wireless communications. In particular, the invention relates to a method, and a corresponding system, for dynamic association of spatial layers to beams, and also to users, in Fixed Wireless Access networks operating in the millimeter-wave frequency range.

BACKGROUND OF THE INVENTION

Massive Multiple Input Multiple Output (Massive MIMO) techniques are reaching a considerable level of maturity as one of the most promising alternatives for increasing the spectral efficiency per unit area in cellular networks. Massive MIMO is characterized by the use of massive amounts of transmit and receive antennas at the base station side to improve the performance of some multi-antenna techniques, namely digital/analog beamforming, and spatial multiplexing.

The millimeter-wave (mmWave) frequency region comprises radio frequencies in the range from 30 GHz to 300 GHz, although in some practical applications frequencies above 6 GHz are also regarded as mmWaves. Massive MIMO in this frequency region relies on the use of suitable beamforming mechanisms to overcome the increased path loss that is characteristic of these frequencies in practical propagation scenarios. The availability of large bandwidths, together with the potential to allocate cellular services, makes these frequencies very well suited for Fixed Wireless Access (FWA) applications.

Digital beamforming techniques make use of multiple independent transceiver chains with full amplitude/phase control of the signals at each antenna. Whilst it is feasible to integrate large numbers of transmit/receive radio-frequency (RF) chains in frequencies below 6 GHz, mmWaves impose many challenges in terms of integration, miniaturization, energy efficiency, and layout complexity with growing numbers of antennas. For this reason, practical applications can make use of hybrid beamforming techniques, where a first digital stage performs full control of the signal over a limited number of transceivers, and a second stage performs analog phase control of the signals coming to/from each antenna.

The lack of full digital control in hybrid beamforming techniques imposes the need to incorporate beam steering capabilities to the wireless system, both in the initial access/discovery phase and in connected mode. While such techniques are sometimes included as part of the baseband processing capacity of some systems (like 3GPP New Radio, NR, or IEEE 802.11ad, WiGig), other systems like IEEE 802.11ac or IEEE 802.11ax lack such capabilities.

Incorporating hybrid beamforming capabilities with no baseband support to beam steering imposes significant constraints to the use of multi-antenna techniques in mmWaves.

In some solutions, as in US 20170215192A1, a static association of spatial layers to beams (also called subsectors) is proposed in mmWaves for FWA, where users are served by one out of multiple beams according to the spatial location of each user. Dynamic association of layers to users is however not disclosed in this patent application. As an example, in case a single user is transmitting or receiving at a given time though one of the beams, with no other user being active at the same time, it is essential to allow association of the remaining (non-transmitting) beams to a single user for increased diversity and/or spatial multiplexing, up to the capacity of the baseband processor subsystem.

In other architectures described in U.S. Pat. No. 947,924B2 and US 20130202054A1, the different beams are served by multiple baseband processor subsystems, in such a way that users served by different beams can benefit from the maximum baseband processing capacity as allocated by the system to each beam. This architecture can provide full capacity to the users, however at the cost of the extra complexity derived from integrating independent baseband processor subsystems to each beam.

The solution disclosed in US 20050063340A1 aims to solve the above-mentioned problems by performing, firstly, a static association of users to beams based on their User ID and space position within the sector, and, secondly, allowing a dynamic association enhance communication performance by means of transmission diversity. Nevertheless, the diversity reached by this solution relies on a temporary switching control of the antenna used in transmission among a pair of best candidates.

In yet another architecture described in US 20160226570A1, a modular antenna array architecture presents multiple sub-arrays capable of steering the beams in any desired direction by employing of suitable phase shifters. This architecture presents maximum flexibility, provided that the baseband processing system supports procedures for beam scanning and beam steering at both initial access and connected mode. This scheme is well-suited for mmWave mobility applications, however it requires as many phase shifters as the product of the number of antennas by the number of layers, which significantly increases complexity while presenting a lower applicability to fixed scenarios like FWA.

Smart strategies for generating multiple beams in FWA are therefore required in order to avoid high baseband complexity or additional constraints imposed by the use of static associations of beams to users.

DESCRIPTION OF THE INVENTION

To that end, the present invention proposes according to a first aspect a method to generate multiple wireless beams in a FWA network operating in mmWave regime, and to associate spatial layers to beams in a flexible and dynamic way, in order to benefit from all combinations of spatial layers available at a base station side as allowed by existing multi-antenna techniques. According to the proposed method, a base station and a customer premises equipment (CPE) are willing to wirelessly transmit and receive data through a wireless channel (or wireless medium) of a FWA network. The base station 101 has beamforming capabilities henceforth generating multiple wireless beams 103 aimed for enhancing signal detection at the CPE.

Unlike the known proposals in the field, the method comprises performing, by the base station, all baseband wireless functions related for creating, keeping and managing the connections between the base station and the CPE at baseband level, wherein information is handled in the form of up to M spatial layer signals that are transmitted/received by a multi-beam antenna array of the base station, and with no built-in capabilities for creation, detection or management of the beams; and performing, by the base station, all necessary RF functions at millimeter-wave frequencies, including beamforming and conversion from complex baseband signals to RF signals and vice versa, in such a way that a fully flexible association between spatial layers and beams is possible hence allowing any spatial layer to be transmitted/received by any beam (103) at a per-user level. The base station also couples the RF signals to said wireless channel and vice versa.

In an embodiment, the initial access of the CPE to the base station is handled by a baseband processor subsystem of the base station. In this particular case, the base station transmits pilots, or beacon signals, so that CPEs can discover the network and access to it. Pilots can be periodically transmitted through multiple beams steered in different angles in azimuth, elevation, or both. The CPE, upon detection of any of the pilot signals, sends back a response with the intention to access the base station. Then, a beam determination module at the base station detects the presence of uplink signals, estimates the beam from which most energy is detected in uplink (i.e. the preferred beam), and connects the group of antenna elements involved in the reception of said preferred beam to inputs of the spatial layers of said baseband processor subsystem. The latter detects the presence of the received signals and starts the initial access procedure. As a result of it, a user identification (user ID) is associated to the preferred beam, and such association is stored at a memory of the baseband processor subsystem, for example in the form of a table, to help transmissions in connected mode.

In an embodiment, said user ID is the Medium Access Control, MAC, address of the CPE.

In an embodiment, the baseband processor subsystem receives data from the network that must be transferred to the CPE (or user) in downlink connected mode. The baseband processor subsystem first checks the preferred beam corresponding to the user ID to be addressed, and forwards a suitable beam indication to a beam switching subsystem of the base station. The beam switching subsystem then associates the signals corresponding to the active spatial layers intended for that CPE with the appropriate beam.

If more than one CPE (or user) is going to be addressed at the same time, the baseband processor subsystem checks the preferred beams corresponding to the active CPEs and sends beam indications to the beam switching subsystem for effective linkage of the spatial layers with the relevant beams. More than one spatial layer can be associated with a single beam directed to one or multiple CPEs, with the only restriction of not exceeding the maximum number of layers as determined by the MIMO capabilities of the base station.

On the other hand, in the uplink connected mode, two different situations may arise. If the base station comprises a radio resource scheduler in charge of allocating radio resources to the CPE, the baseband processor subsystem provides at least one beam indicator (it can provide more than one) to the beam switching subsystem in order the latter activating the preferred beam for uplink reception corresponding to the user IDs contained in the cited table, including the ability to activate more than one beam if the base station supports MU-MIMO and several CPEs located at different preferred beams are transmitting at the same time. Alternatively, if the base station does not comprise a radio resource scheduler, a beam determination module at the base station detects a preferred beam (i.e. the beam that best fits) for uplink connected mode according to a physical location of the CPE, and provides a beam indicator (it can provide more than one) to the beam switching subsystem for connecting the outputs from the M groups of antennas corresponding to said preferred beam for uplink connected mode to the M spatial layer signals that are input to the baseband processor subsystem.

The M spatial layer signals can be either coherently combined by the baseband processor subsystem with Maximal Ratio Combining (MRC) or Interference Rejection Combining (IRC) to reinforce detection in the case of a single-layer transmission by the CPE, or jointly decoded to perform spatial de-multiplexing of the layers, in the case of a multi-layer transmission by the CPE.

In yet another embodiment, the preferred beam for uplink connected mode is detected by an energy detection module of the beam determination module detecting the strongest energy at the outputs of a plurality of Low-Noise Amplifiers (LNAs) of the spatial layer signals, and assigning to said beam detected with the strongest energy to the preferred beam for uplink connected mode. Then, the baseband processor subsystem obtains the user ID after decoding an uplink packet, and compares the preferred beam stored in the table with the preferred beam for uplink connected mode. The baseband processor subsystem discards said uplink packet in the event of a mismatch between the preferred beam for uplink connected mode and the preferred beam stored in the table for that user ID.

Upon reception of the beam indicator(s) from either the baseband processor subsystem or the beam determination module the beam switching subsystem connects the outputs from the M groups of antennas corresponding to said preferred beam with the M spatial layer signals that are input to the baseband processor subsystem.

According to another aspect, present invention also provides a system to dynamically associate spatial layers to beams in a FWA network operating in the millimeter-wave frequency range. The proposed system comprises at least one base station and at least one CPE willing to wirelessly transmit and receive data through a wireless channel (or wireless medium) of said FWA network.

The base station has beamforming capabilities henceforth generating multiple wireless beams aimed for enhancing signal detection at the CPE.

In addition, the base station comprises:
- a baseband processor subsystem to perform all baseband wireless functions related to creating, keeping and managing the connections between the base station and the CPE at baseband level, wherein information is handled in the form of up to M spatial layer signals that are transmitted/received by a multi-beam antenna array of the base station, and with no built-in capabilities for creation, detection or management of the beams;
- a radio-frequency, RF, frontend subsystem to perform all necessary RF functions at millimeter-wave frequencies, including beamforming and conversion from complex baseband signals to RF signals and vice versa, in such a way that a fully flexible association between spatial layers and beams is possible hence allowing any spatial layer to be transmitted/received by any beam at a per-user level;
- a multi-beam antenna array to couple the RF signals to said wireless channel and vice versa, comprising a collection of N antenna elements prepared to transmit and receive in the millimeter-wave frequency range; and
- a wireline backhaul link to connect the base station with the CPE.

In an embodiment, the FWA network comprises multiple cells, which are sub-divided into sectors, each sector being covered by at least one of said beams, and wherein each beam comprises a given beamwidth in a horizontal and/or vertical plane.

The beams can be statically steered along different orientations to cover the entire sector by using phase shifters, microstrip transmission lines, mechanically-steered devices, or any technique capable of applying a progressive phase shift to the RF signals to be transmitted by the N antenna elements in said multi-beam antenna array.

In an embodiment, the multi-beam antenna array further comprises a collection of B sub-arrays to steer the RF signals along said beams. Each sub-array comprises M groups of (N/B)/M antenna elements to take care of the transmission and/or reception of the M spatial layer signals.

Moreover, the RF frontend subsystem may comprises the following elements:
- a beam switching subsystem to dynamically connect said spatial layer signals to said groups of antenna elements in uplink or downlink, in such a way that only the groups of antenna elements corresponding to the beam in use for said CPE are involved in the transmission/reception of the signals to/from such CPE; and
- a beam determination module to detect uplink signals from the CPE and to select which of the groups of antenna elements corresponding to the available beams are to be connected to said baseband processor subsystem for uplink reception.

Likewise, the beam switching subsystem may comprise M RF switches adapted and configured to route the spatial layer signals towards any of the available beams in downlink direction. In particular, each RF switch has one input port corresponding to one spatial layer signal and B possible outputs, with a control input that depends on the information stored in a table at a memory of the baseband processor subsystem that contains an association between active CPEs and preferred beams throughout the lifetime of the connection.

Even, other aspects of the present invention include software programs to perform the method, embodiment steps and operations summarized above and disclosed in detail below. More particularly, a computer program product is one embodiment that has a computer-readable medium including computer program instructions encoded thereon that when executed on at least one processor in a computer element causes the processor to perform the operations indicated herein as embodiments of the invention Thus, present invention provides a method, and corresponding system, to generate beams in FWA applications and to associate spatial layers to beams in a flexible and dynamic way, in such a way that users can benefit from the available spatial layers irrespective of their location in the sector.

Prior state-of-the-art techniques either assign layers to beams in a static way (hence lacking flexibility), or independently allocate multiple layers per beam (hence increasing the overall complexity). Other more advanced designs involve full beam scanning capabilities, by comprising as many phase shifters as given by the product of the number of layers and antennas, but this requires significant complexity as well as the support of beam scanning techniques at the baseband processor.

The proposed invention can overcome the limitations of prior techniques, either in flexibility or in complexity, by allowing full flexibility in the association of layers to beams in multi-antenna systems. Such flexibility is essential in FWA applications for extending coverage and improving the individual user throughput.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF PREFERRED EMBODIMENTS

Figure 1:
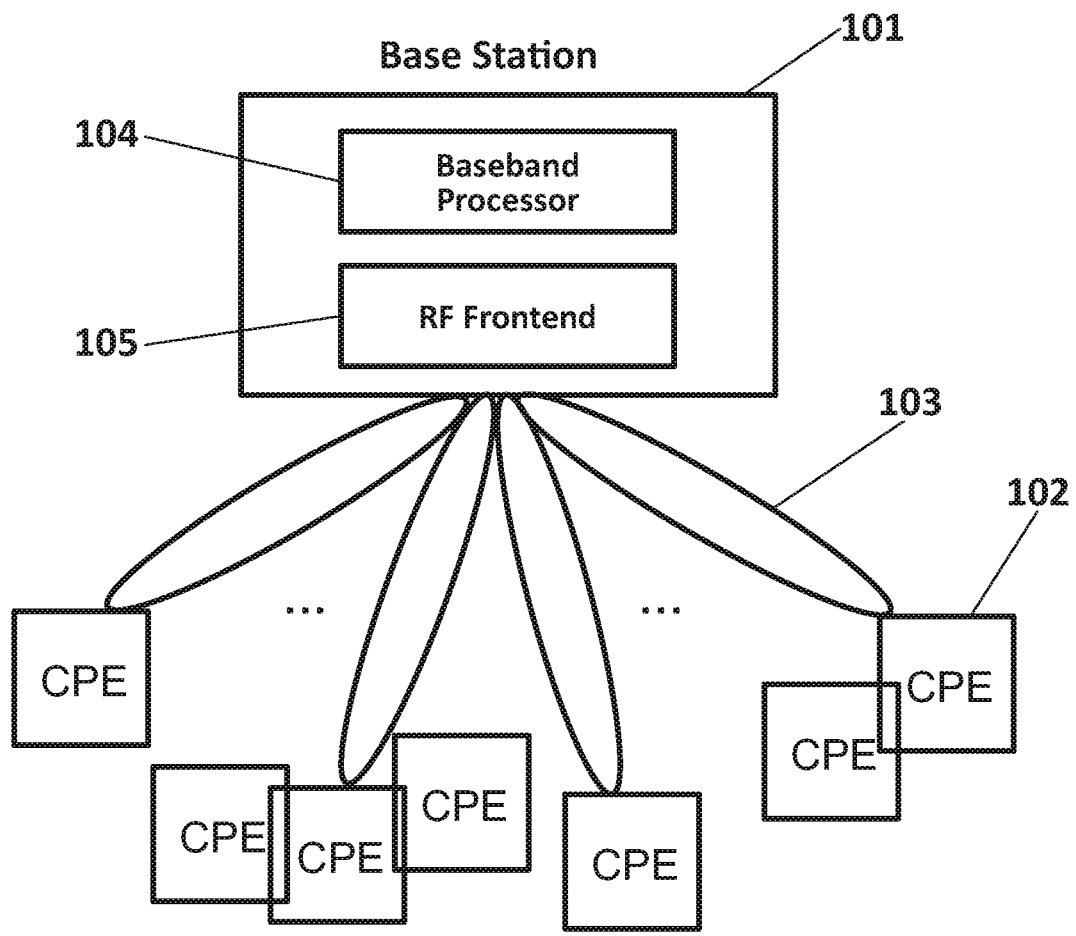
FIG. 1 shows the basis scenario for applicability of the present invention. In particular, this scenario comprises at least a base station, equipped with one or multiple sectors, and a given number of users willing to access broadband data services and located at different households under coverage of the base station. Broadband services include, but are not limited to, Internet, voice over IP, video on demand, IP television (IPTV), and other similar multimedia applications. Such broadband services are provided by means of suitable fixed wireless connections between the base station and the Customer Premises Equipment (CPE). Each sector in the base station is capable of generating multiple wireless beams that cover the intended area in the mmWave frequency range. Beams are generated by means of multi-antenna techniques in such a way that association of beams to spatial layers can be done dynamically in a flexible way.

FIG. 1 illustrates an embodiment of the proposed system. According to this particular embodiment, the system comprises a base station 101 that performs transmission and reception of suitable wireless signals to/from multiple users, using a pre-determined number B of wireless beams 103. The base station 101 comprises at least a baseband processor subsystem 104 that performs all necessary baseband tasks upon transmission and reception, and a RF frontend subsystem 105 aimed at translating the baseband signals to the desired frequency range as well as coupling the system to the wireless medium by means of adequate radiating structures, like antennas or antenna arrays. The baseband processor 104 is capable to handle up to M different signals corresponding to spatial layers, which can be associated to one or multiple users, through one or multiple beams 103. Each beam 103 can serve one or multiple users simultaneously. Users are assumed to be located in static positions, and the frequencies of operation will belong to the mmWave frequency range (in practice, above 24 GHz to avoid conflicts with the satellite ecosystem). Antenna arrays comprising N antennas are assumed to be present in the RF frontend subsystem, thus enabling the use of suitable beamforming techniques to overcome pathloss.

Figure 2:
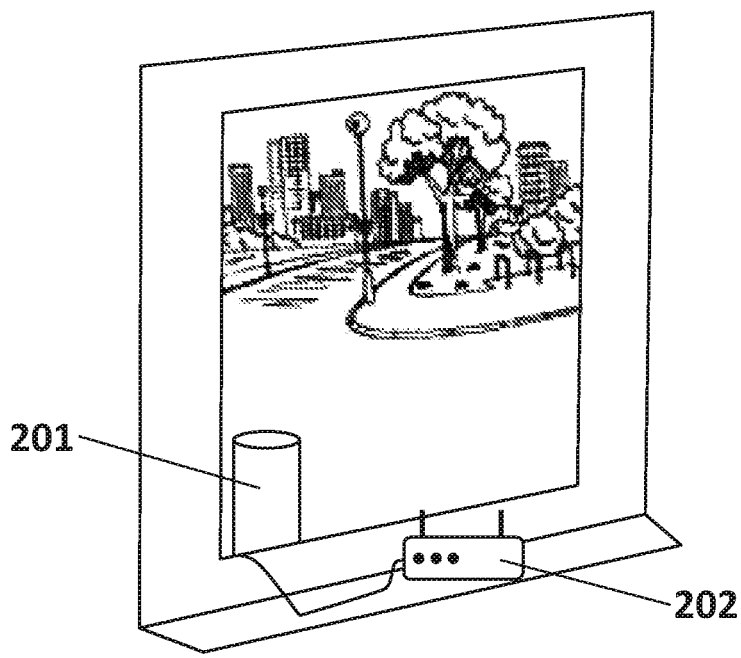
FIG. 2 illustrates an example of a CPE, in this case comprising an outdoor and an indoor unit.

Users are served by means of a suitable CPE 102, which is a device installed at the user premises and usually oriented towards the base station 101 to benefit from good signal propagation conditions (ideally, but not necessarily, line of sight). CPEs 102 can comprise either a single outdoor unit 201, installed in a convenient place at the user's premises, or the combination of an outdoor unit 201 and an indoor unit 202, as shown in FIG. 2. The latter in this case would be in charge of distributing the signal indoors by means of any suitable wireline or wireless standard, like Ethernet (IEEE 802.3), WiFi (IEEE 802.11) or Bluetooth (IEEE 802.15), among others. The outdoor unit 201 would be in charge of communicating with the base station 101 by means of any suitable wireless standard operating in mmWaves, also with some beamforming capabilities through use of multiple (M) antennas.

Figure 3:
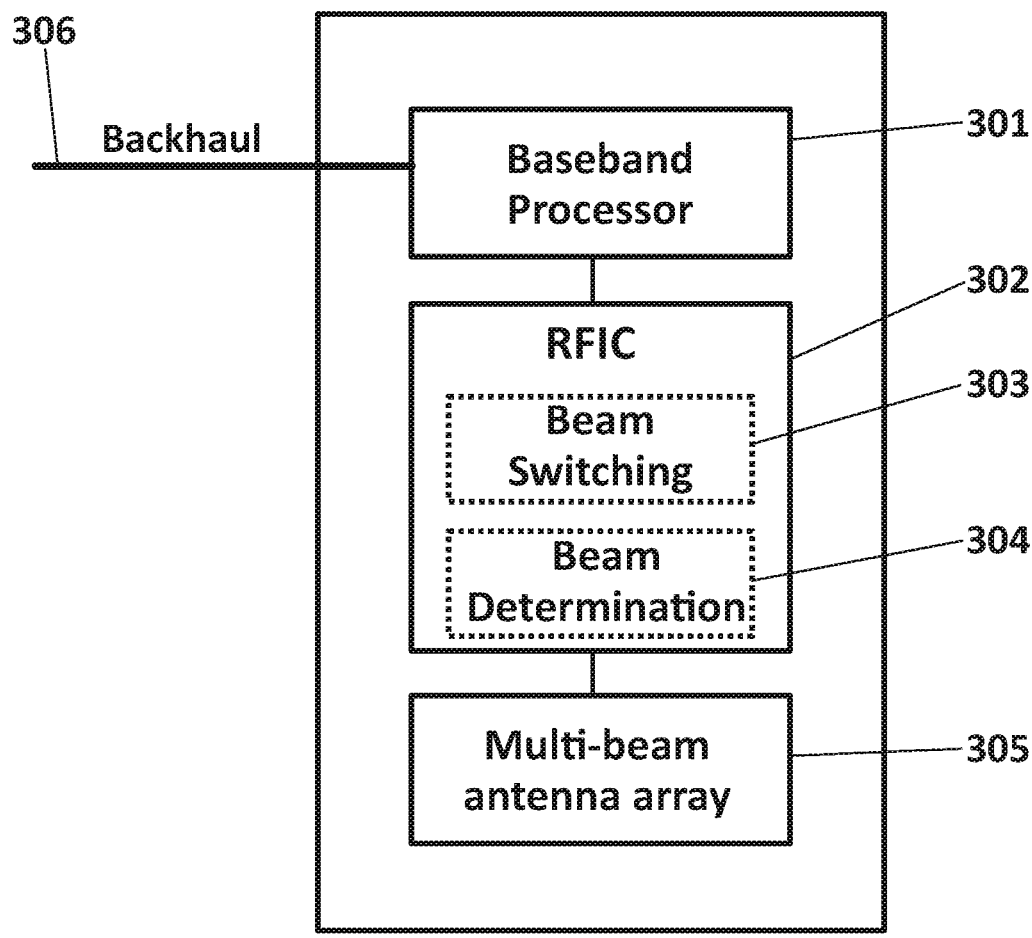
FIG. 3 illustrates the base station architecture according to an embodiment of the present invention.

With reference to FIG. 3, therein it is illustrated a high-level diagram of a wireless base station 101 suited for FWA applications. For the purposes of the present invention, only the modules that are considered relevant are described and its constituent elements highlighted. More elements are implicit for a correct operation, like filters, amplifiers, diplexers, passive elements or RF switches, among others.

The baseband processor subsystem 301 performs all baseband functions required by the wireless standard in use by the base station 101 at transmission and reception. It works at baseband digital level with the complex IQ digitized samples of the baseband signals, which are later converted to analog domain and translated to the desired carrier frequency by the RFIC. Data are transferred to the rest of the network by means of a suitable backhaul connection 306, as shown FIG. 3.

The RFIC 302 contains all necessary RF functions aimed to convert the complex baseband signals into proper analog real signals at the carrier frequency that feed the multi-beam antenna array 305. The beam switching subsystem 303 can be considered part of the RFIC (as in FIG. 3), or comprise an independent sub-module. It controls the multi-beam antenna array 305 in order to generate multiple beams and spatial layers as allowed by the base station 101. The beam determination module 304 can also be considered part of the RFIC, and detects the presence of uplink signals by means of suitable energy detectors. It connects the RF chains of the beam 103 with strongest reception to the baseband processor subsystem 301, switching off the other beams 103 to avoid interference.

The multi-beam antenna array 305 couples the RF signals with the wireless medium and comprises a collection of N antennas prepared to transmit and receive in the mmWave frequency range. Antennas are usually arranged in a rectangular planar array, but can also follow other geometrical shapes as per the base station 101 needs.

Initial Access of the Users.—

Figure 4:
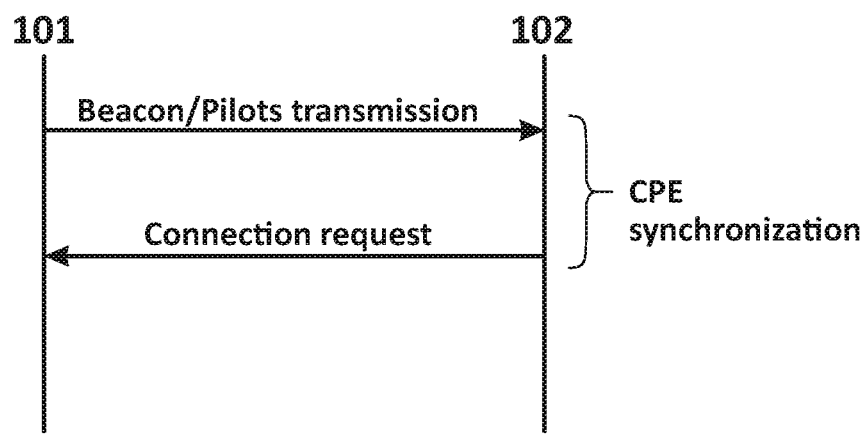
FIG. 4 illustrates a prior art example of the discovery phase between a base station and a CPE.

The basic procedure to connect CPEs 102 to the base station 101 in a typical FWA scenario comprises the steps depicted in FIG. 4. A user's CPE 102 first discovers the presence of a base station 101 by means of suitable pilots, or beacons, that are assumed to be periodically detectable. The CPE 102 synchronizes its internal circuitry to the actual frequency of operation, and then transmits back a suitable signal indicating the willingness of the user to connect to such network. This will be referred to as the "discovery phase". The details change according to the actual wireless standard in use, but the intention in all of them is to allow the base station 101 to register the presence of a user willing to access the base station 101, and the appropriate acknowledgment.

Figure 5:
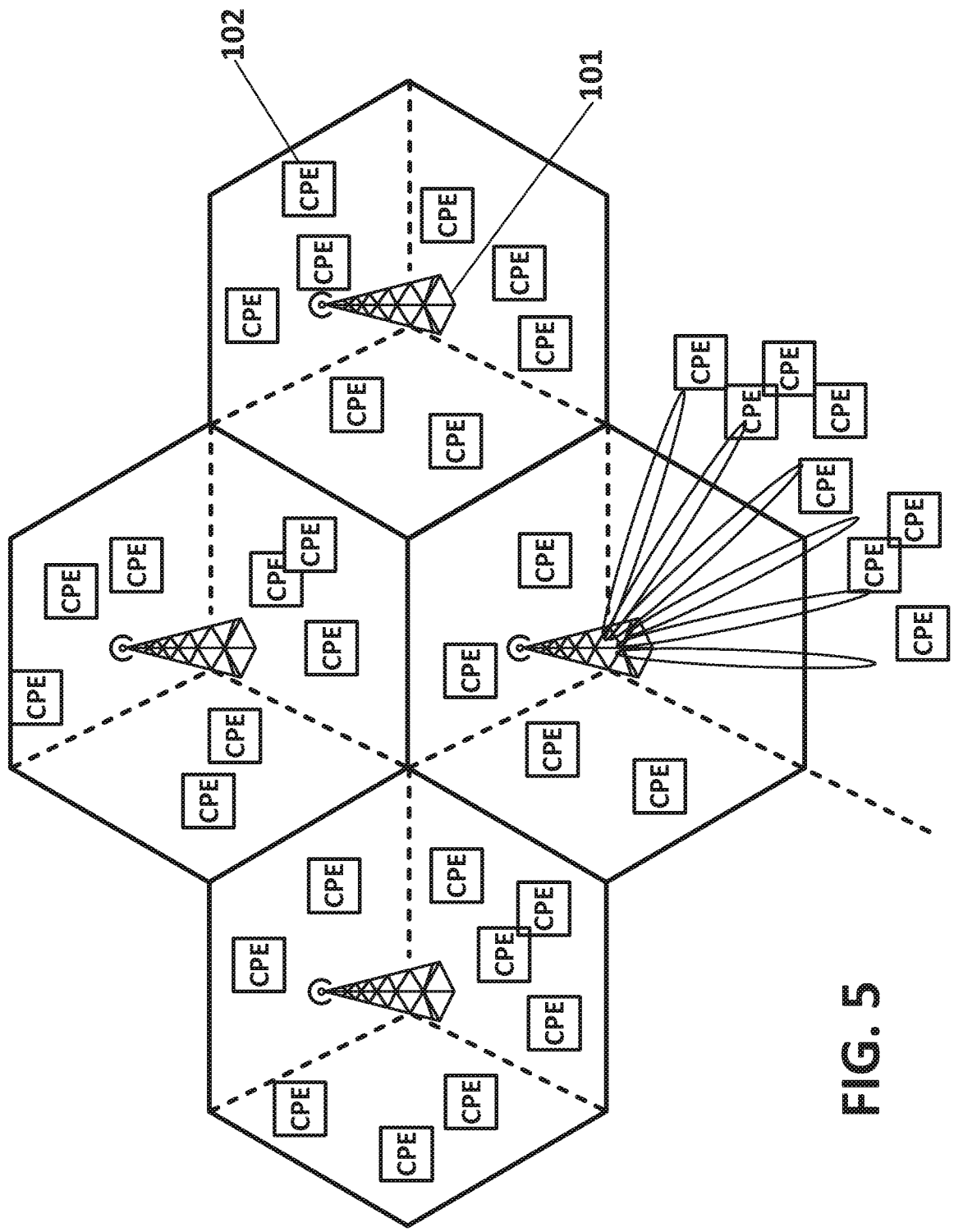
FIG. 5 illustrates an example of the network scenario.
Figure 6:
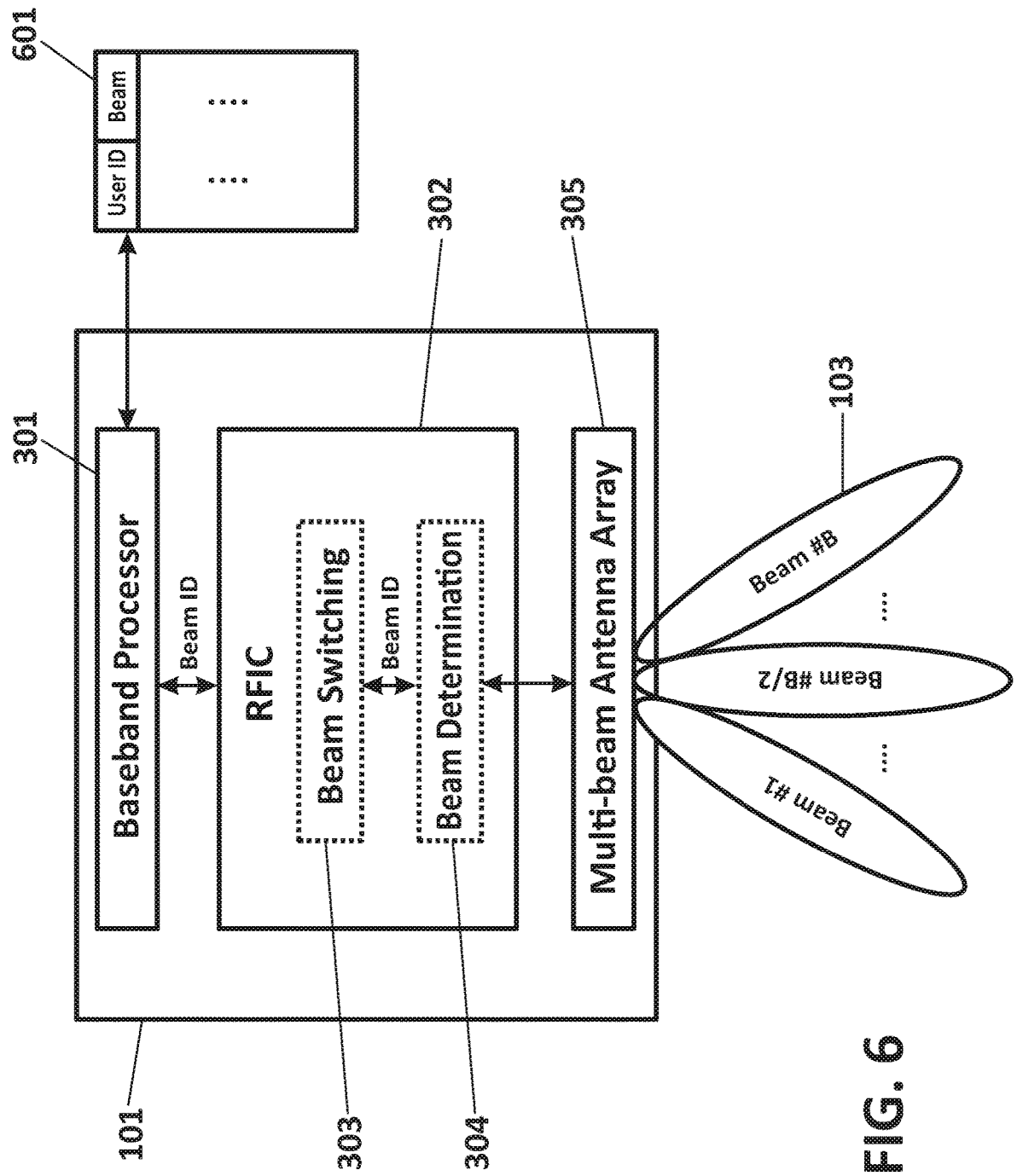
FIG. 6 illustrates an embodiment of the beam determination process during the discovery phase.

Pilots will be assumed to be visible everywhere in the base station 101. In particular, the network scenario is assumed to comprise multiple cells, further sub-divided into sectors, wherein the base station 101 is capable of serving all CPEs 102 within (see FIG. 5). Pilots are therefore transmitted through multiple beams 103 steered in different angles, either in azimuth, elevation, or both. The response from the CPE 102, however, will arrive at the base station 101 only at a definite direction in space corresponding to the actual signal echoes that impinge the receiver. Given the likely presence of line of sight conditions between base station 101 and CPE 102 to overcome pathloss, and that beamforming narrows down the angular spread of the signal at transmission and reception, the base station 101 will likely receive a strongest echo in one specific beam 103, with possibly additional echoes present in other beams 103. In FIG. 6, a beam determination module within the RFIC 304 will then discriminate the beam 103 of strongest reception for the received signal (i.e. the preferred beam), route the RF signal through a beam switching subsystem 303 back to the baseband processor subsystem 301, and forward an indication of the preferred beam for later use.

With this information, the baseband processor subsystem 301 will detect the presence of the received signal and start the initial access procedure according to the specifics of the wireless standard in use. As a result of initial access, an appropriate user identification (user ID) is stored in a memory of the baseband subsystem 301, for example in the form of a table 601, for subsequent communications to/from it in connected state. Together with such identification, a preferred beam identifier will also be associated to it such that the pair (user ID, preferred beam) identifies the users camping (or registered) in the cell and links them with the actual beam in use. This would successfully complete the discovery phase.

According to the present invention, the user ID may comprise a MAC address, a Radio Network Temporary Identification (RNTI), or any other suitable and non-ambiguous identifier. The scope for user identification can be limited to a sector or cell where users can be unambiguously addressed with a specific beam.

Connected Mode in Downlink Direction.—

Whenever data is to be transferred to the CPE 102 coming from elsewhere in the network, the system enters into connected mode. Data directed to a specific CPE 102 may involve one or several spatial layers (up to M) according to the MIMO order of the transmission, which in turn depends on the propagation characteristics and MIMO capabilities of the user device 102.

Figure 7:
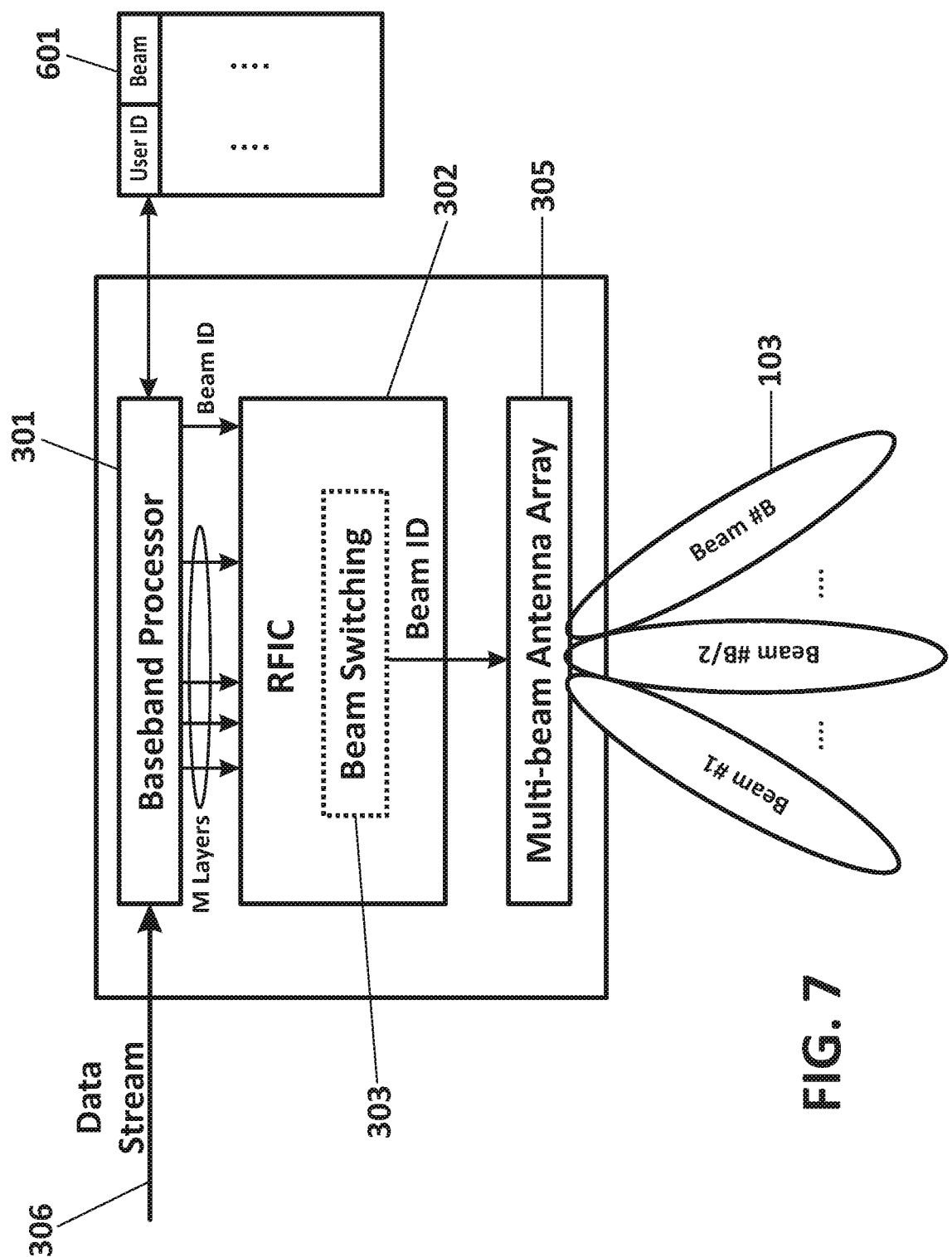
FIG. 7 illustrates an embodiment of the beam switching process during data transmission in downlink.

In downlink direction, in an embodiment, the baseband processor subsystem 301 first checks the preferred beam corresponding to the user ID to be addressed, and forwards a suitable beam indication to the beam switching subsystem 303 as shown in FIG. 7. The beam switching subsystem 303 then associates the signals corresponding to the active spatial layers intended for that user with the appropriate beam 103. If more than one user (CPE 102) is going to be addressed at the same time (with one or multiple spatial layers per user), MU-MIMO techniques can be leveraged. The baseband processor 301 checks the preferred beams 103 corresponding to the active CPEs 102, and sends beam indications to the beam switching subsystem 303 for effective linkage of the spatial layers with the relevant beams 103. More than one spatial layer can be associated with a single beam 103 directed to one or multiple CPEs 102, with the only restriction of not exceeding the maximum number of layers as determined by the MIMO capabilities of the base station.

Figure 8:
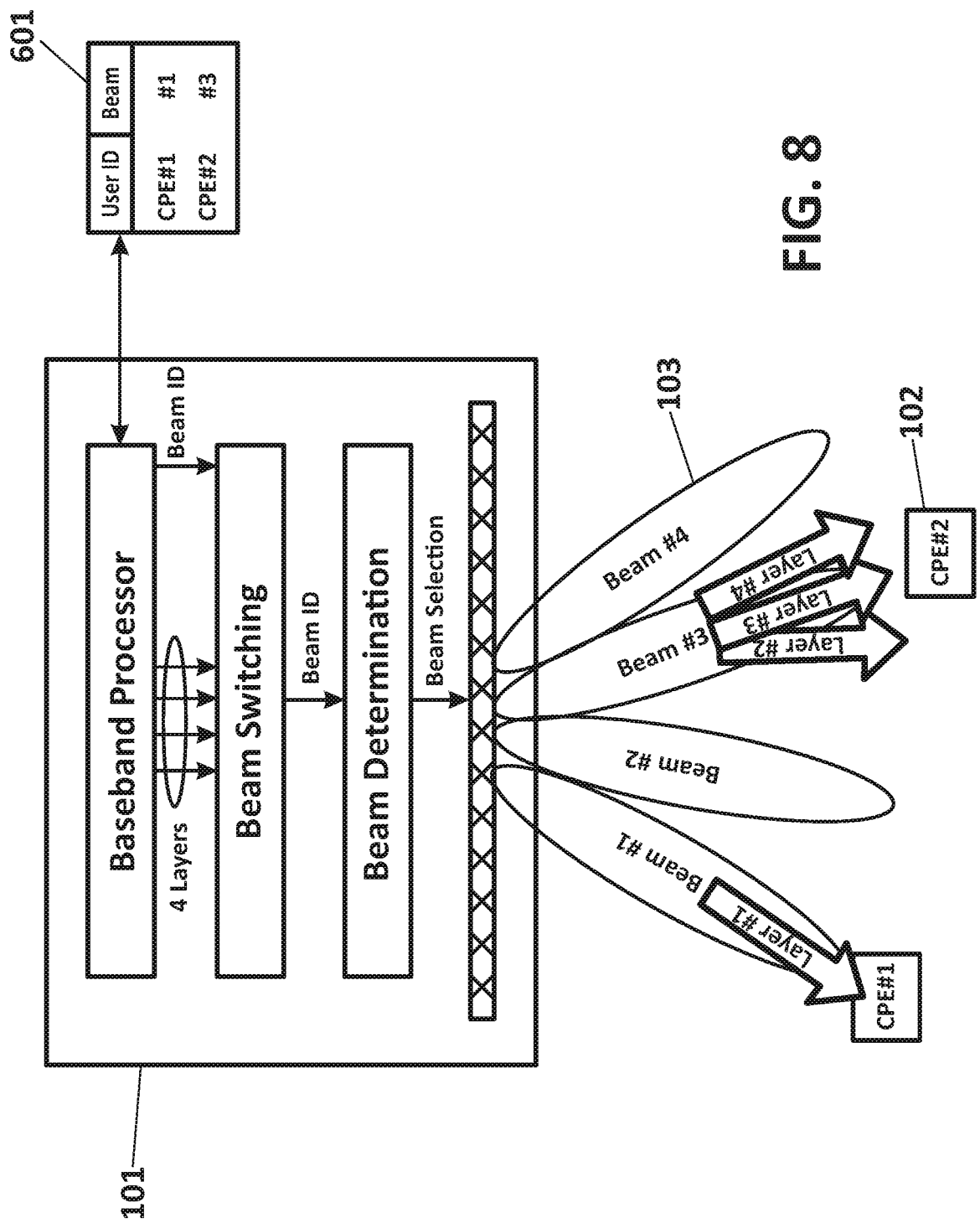
FIG. 8 shows an example of the association of beams to layers in downlink.

Active CPEs 102 may belong to the same or different beams 103, and each of them may be addressed with one or multiple spatial layers, depending on the user's capabilities and the maximum number of layers M supported by the base station. As an example, in a hypothetical scenario illustrated in FIG. 8, two CPEs 102 are active at a time in different beams 103 of a base station 101 supporting a maximum of four simultaneous beams 103 and four spatial layers (B=4 and M=4). The first CPE (CPE #1 in the figure), assumed to support a maximum of one layer, receives only one spatial layer in one of the beams 103. The other user (CPE #2 in the figure), assumed to support up to MIMO 3×3, receives three simultaneous spatial layers in another beam 103. The three layers in the CPE #2 may either improve the received signal quality through beamforming or transmit diversity techniques, or increase data rate through the use of spatial multiplexing. The use of one or the other method will be a choice of the baseband processor subsystem 301 and will depend on the instantaneous channel conditions.

Signals corresponding to the different beams 103 will be actually transmitted by means of any suitable multi-antenna technique. Alternatives involve the use of phase shifters, Rotman lens, Luneburg lens, waveguide transformers, or other RF devices aimed at introducing progressive phases to the signals exciting the antenna elements of the array 305. One important constraint when selecting such type of RF device is that it should allow combination of up to M signals (corresponding to M spatial layers) into a single beam, as would be the case when all M layers have to be transmitted in a single beam (towards either a single CPE 102 or multiple CPEs 102).

Figure 9:
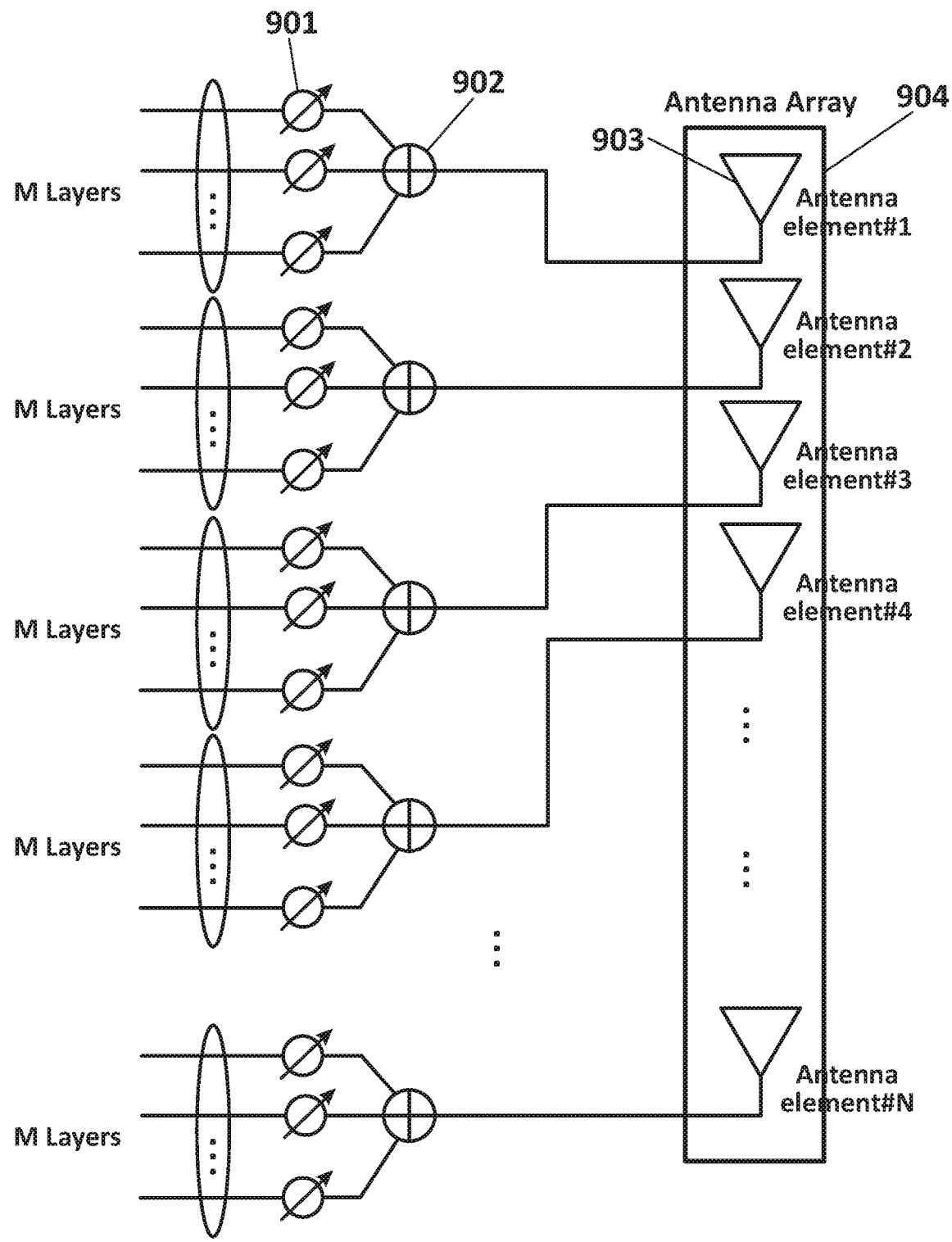
FIG. 9 illustrates a prior art architecture of the multi-beam antenna array.

With reference to FIG. 9, therein it is illustrated a multi-beam antenna array architecture 305 from prior-art techniques. The multi-beam antenna array 305 allows combination of multiple spatial layers into a single or multiple beams 103. Assuming that a maximum of M layers are to be transmitted by the antenna array 904, and that full horizontal and vertical beamforming is allowed, N antenna elements 903 are arranged (usually in a rectangular configuration) together with N×M programmable phase shifters 901. Phase shifters 901 perform the task of shifting the phases of the antenna elements in order to steer the directions of the M spatial layers in use. Each antenna element 903 must then be controlled by M different phase shifters 901, whose outputs are combined 902 to allow simultaneous transmission/reception in possibly different directions. Sometimes only discrete phase shifts 901 are allowed to simplify the phase shifter elements.

Although having maximum flexibility, the main limitation in this prior art architecture is the complexity of the overall design. Phase shifters 901 introduce insertion losses and increase the overall cost and complexity especially when packing very dense antenna structures.

Figure 10:
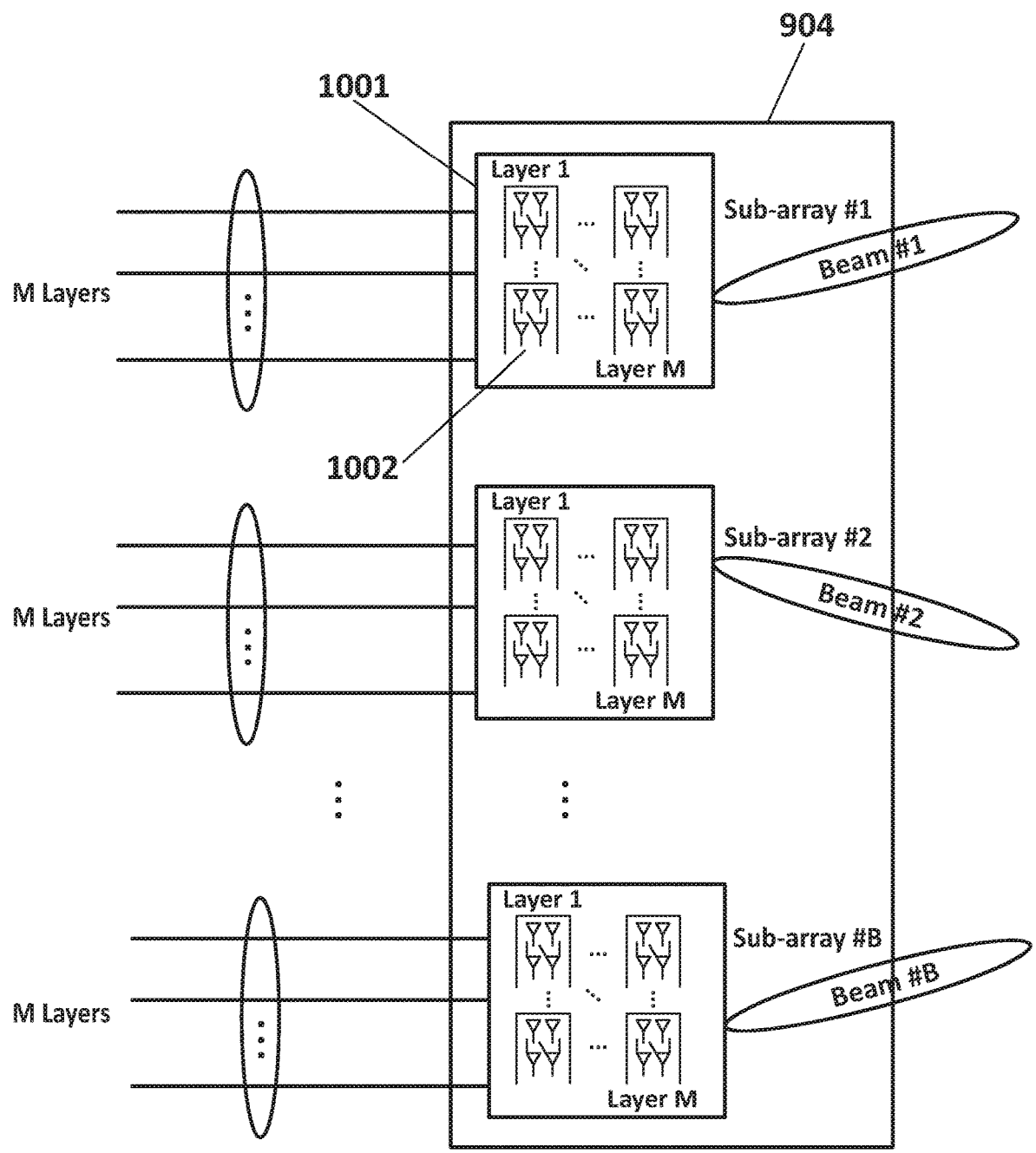
FIG. 10 illustrates an embodiment of the antenna multi-beam array with sub-array division applicable to downlink connected mode.

An alternative simpler arrangement for the multi-beam antenna array 305 is shown in FIG. 10. It involves a collection of B sub-arrays 1001, where each antenna sub-array 1001 contains (N/B) antenna elements 1002 and is suited to steer radiation statically in a specific direction in space (either mechanically or electrically). Each sub-array 1001 should allow transmission of up to M spatial layers, although again the total number of transmitted layers in all the beams 103 must not exceed M. Different spatial layers will have to be assigned different groups of antennas, in order to allow independent generation of more than one spatial layer inside a given beam 103. Hence, up to M groups of (N/B)/M antennas can be included inside each sub-array 1001.

Figure 11:
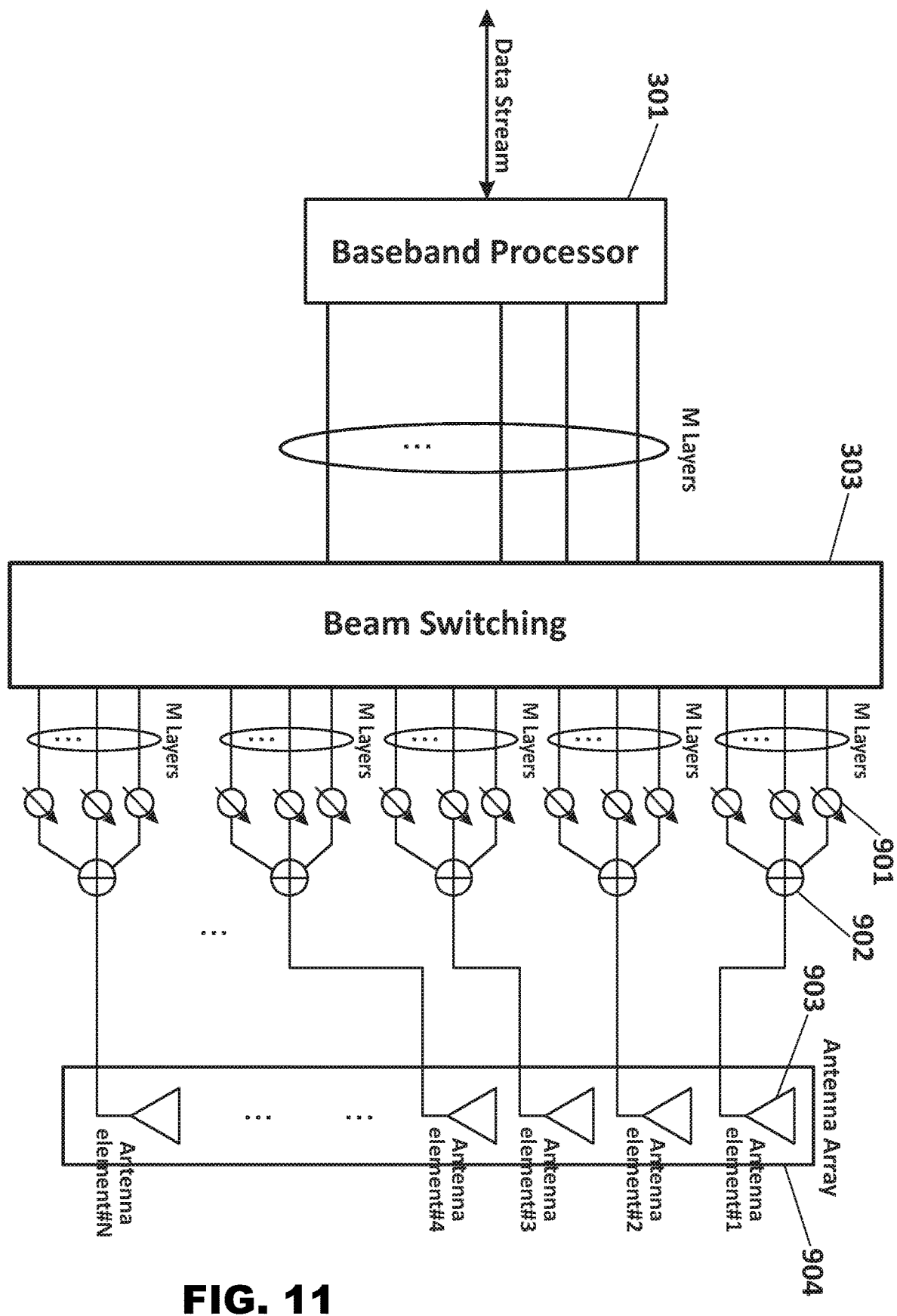
FIG. 11 illustrates an embodiment of the beam switching subsystem applicable to downlink connected mode.

With reference to FIG. 11, therein it is illustrated an embodiment of the beam switching subsystem 303 relating to the antenna array 904 of FIG. 9. In this case, M input ports carry the signals of the different spatial layers as delivered by the baseband processor subsystem 301. The spatial layers are routed to the phase shifter structure, where N×M control outputs configure the shifts of the N×M phase shifters 901 in order to steer the beams 103 corresponding to the M spatial layer signals.

Figure 12:
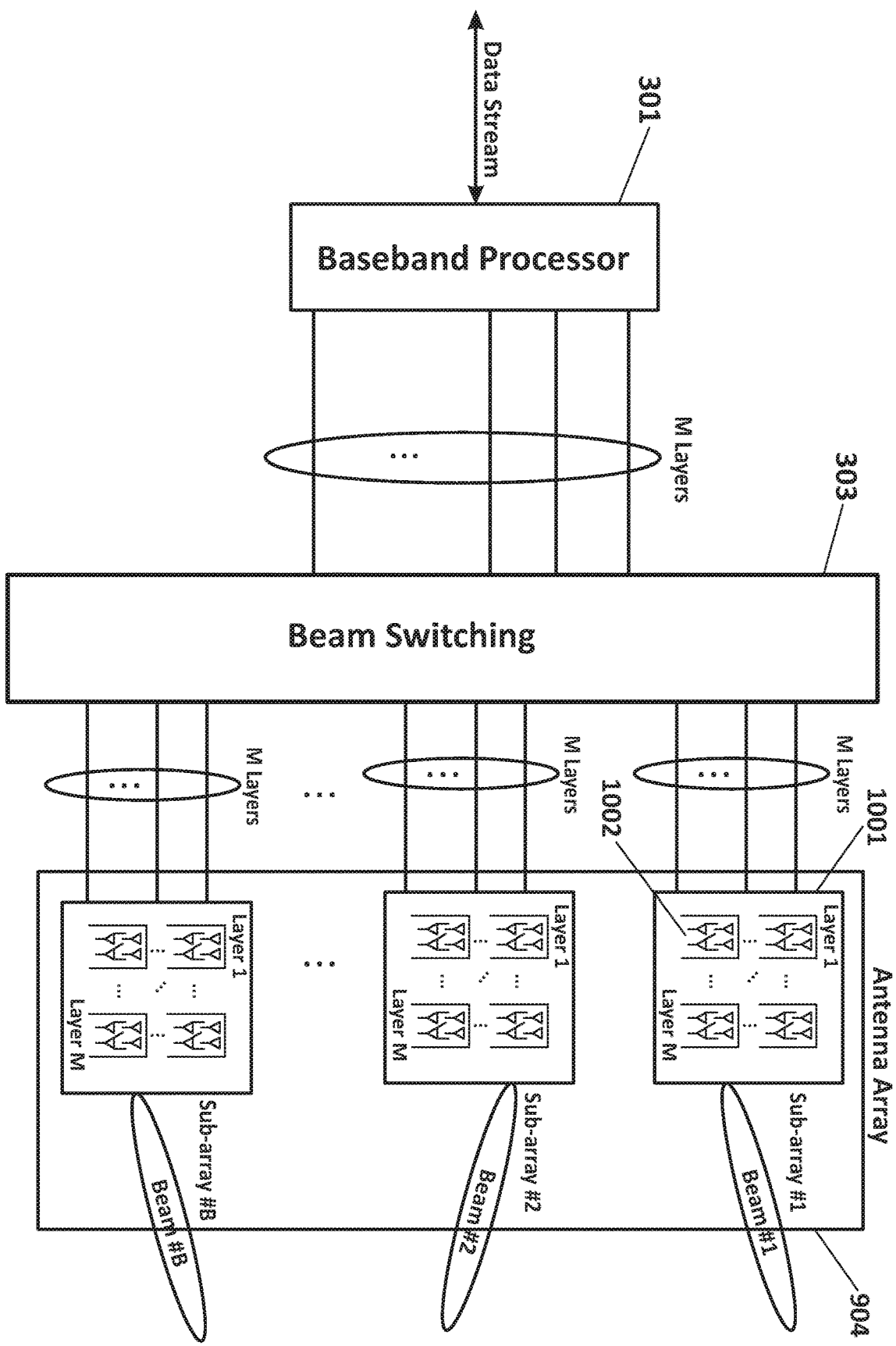
FIG. 12 illustrates an embodiment of the beam switching subsystem with antenna sub-array division applicable to downlink connected mode.

In another embodiment, shown in FIG. 12 with reference to FIG. 10, B×M output ports from the beam switching subsystem 303 reach B×M different groups of antennas 1002 along all the sub-arrays 1001, for individual excitation of the spatial layers transmitted in each beam 103. Only the groups of antennas 1002 actually involved in the transmission of the active layers are excited for each beam 103. One or more beams 103 can be active at a given instant (depending on the CPEs 102 being served through MU-MIMO), and the total number of transmitted layers in all the beams 103 must not exceed M. A maximum of M groups of antennas 1002 can be simultaneously active at a time (belonging to the same or different beams 103).

Figure 13:
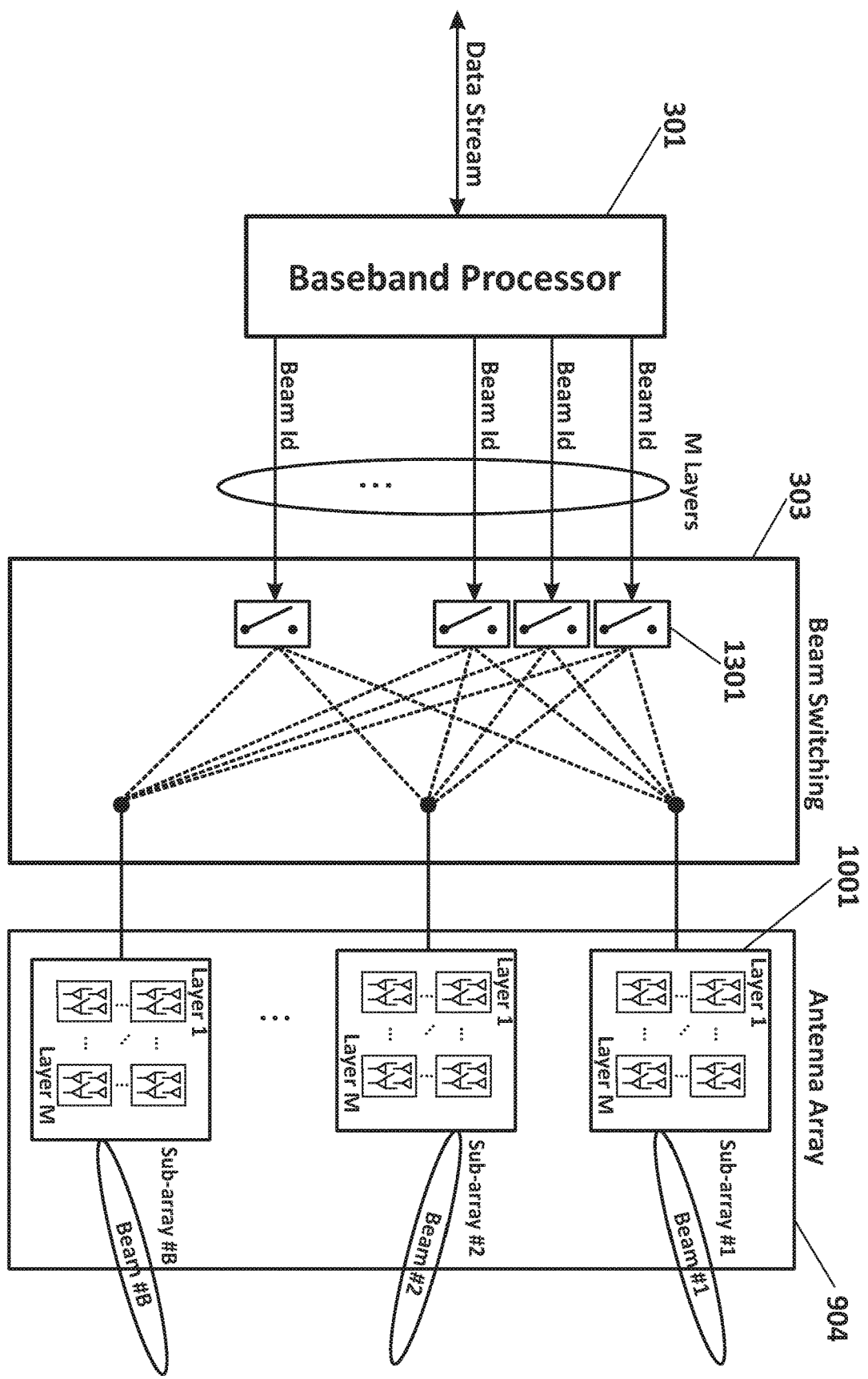
FIG. 13 is an example of the beam switching subsystem structure.

FIG. 13 shows an embodiment that illustrates a possible structure of the beam switching subsystem 303 with reference to FIG. 12. The baseband processor subsystem 301 first indicates, according to the association made during initial access between CPEs 102 and beams 103, which of the B beams 103 must be active for each spatial layer. A number of RF switches 1301 then connect the spatial layers with the group of antennas 1002 in each beam 103 that are in charge of the transmission of that layer. There are a total of M switches 1301, each capable to route one spatial layer signal towards any of the beams 103. Each RF switch 1301 has one input port (corresponding to one layer signal) and B possible outputs (corresponding to the different beams 103), with a control input that depends on the active CPEs 102 at each instant and the association (user ID, preferred beam) made after initial access.

Connected Mode in Uplink Direction.—

Whenever a user (CPE 102) is willing to transmit payload data to the network, the user device will enter into connected mode (if not already in it) and transmission towards the base station 101 will start.

In uplink direction, one or multiple CPEs 102 may be active at a time and transmit payload data to the base station 101. In a multi-beam scenario, the base station 101 has to be prepared for collecting energy from CPEs 102 located in any direction through the most appropriate beam 103.

If the base station 101 implements a radio resource scheduler, as e.g. in 5G NR or IEEE 802.11ax, the baseband processor subsystem 301 will know in advance which devices are to be active at each instant and will prepare the multi-beam antenna array 305, and the beam switching subsystem 303, for it. As shown in FIG. 7 for downlink direction, suitable beam indicators can be sent by the baseband processor subsystem 301 to the beam switching subsystem 303 in order to activate the appropriate beams also for uplink reception, and to switch on only the receive amplifiers actually involved. If several CPEs 102 located at different beams 103 transmit at the same time, and if the base station 101 supports MU-MIMO, more than one beam 103 will need to be activated.

Figure 14:
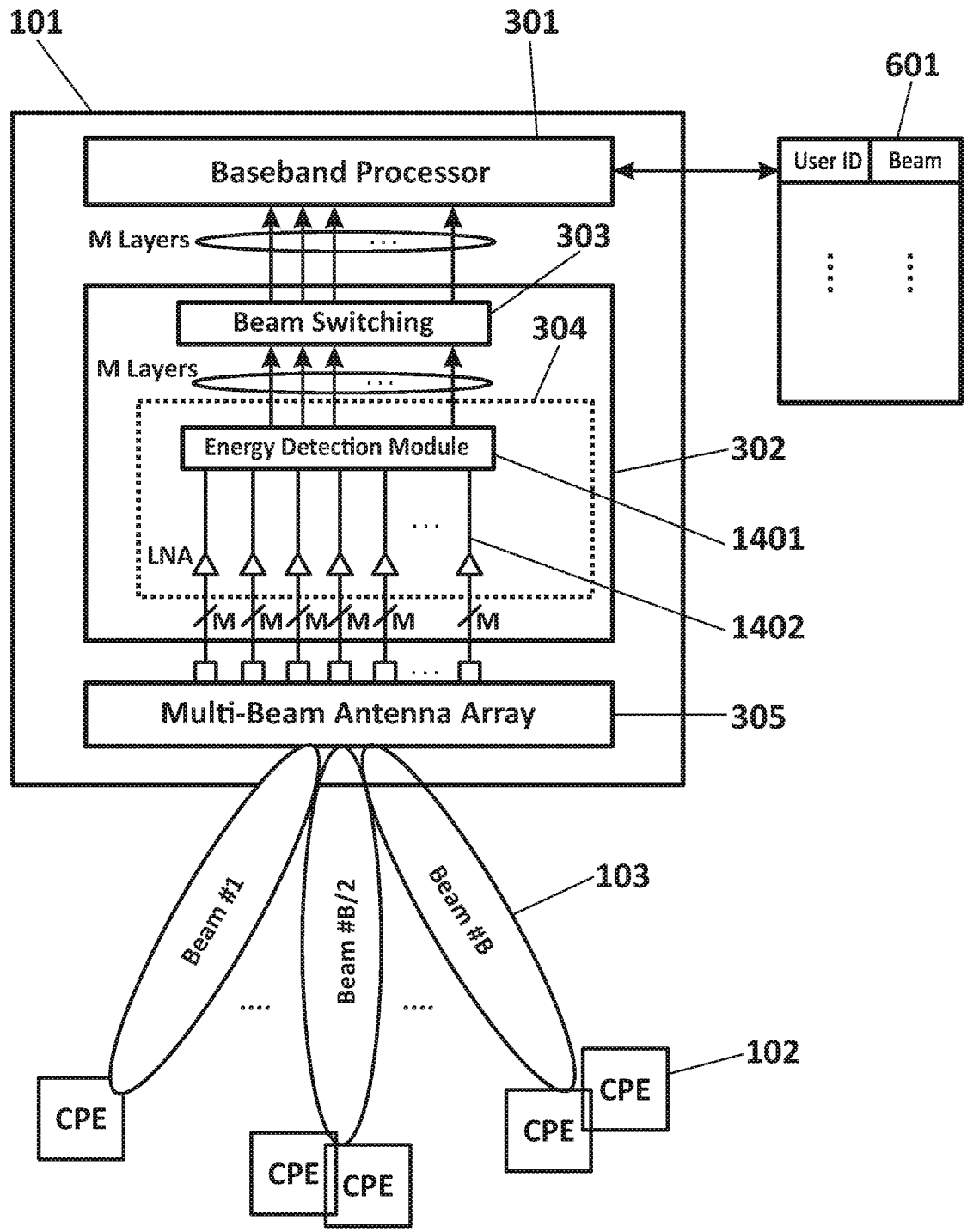
FIG. 14 illustrates an embodiment of the beam detection in uplink with no radio resource scheduler support.

If the base station does not support a radio resource scheduler, as e.g. in IEEE 802.11ac, the system will have to find the beam 103 that best fits with the physical location of the CPE 102 (termed preferred beam for uplink connected mode). Beam finding can be performed by different methods, including detecting the strongest energy 1401 at the outputs of the LNAs 1402 of the different spatial layers, as shown in FIG. 14. Once the signal is received and the user ID is decoded, the detected beam can be double-checked against the pair (user ID, preferred beam) previously stored in the table 601 during the initial access phase. Any mismatched decisions can lead to discard the packet to prevent an erroneous reception through an incorrect beam, which can be motivated by either channel noise, channel multipath, interference, or any other signal impairment.

The multi-beam antenna array 305 structures described before can also be discussed in the context of uplink direction. Referring back to FIG. 9, the baseband processor subsystem 301 must know in advance which beam 103 needs to be activated at each time instant for reception of an uplink signal of a given CPE 102. This requires the presence of a radio resource scheduler, and access to the pairs (user ID, preferred beam) as discovered during the initial access phase. If no radio resource scheduler is implemented, the base station 101 will not have a-priori knowledge of the uplink signals to be received by the CPEs 102. If one or multiple uplink signals are suddenly received at a given time instant, the lack of information on the expected beams 103 makes it very difficult for the beam switching subsystem 303 to quickly activate the corresponding beams 103 for correct reception at the appropriate time instants.

Figure 15:
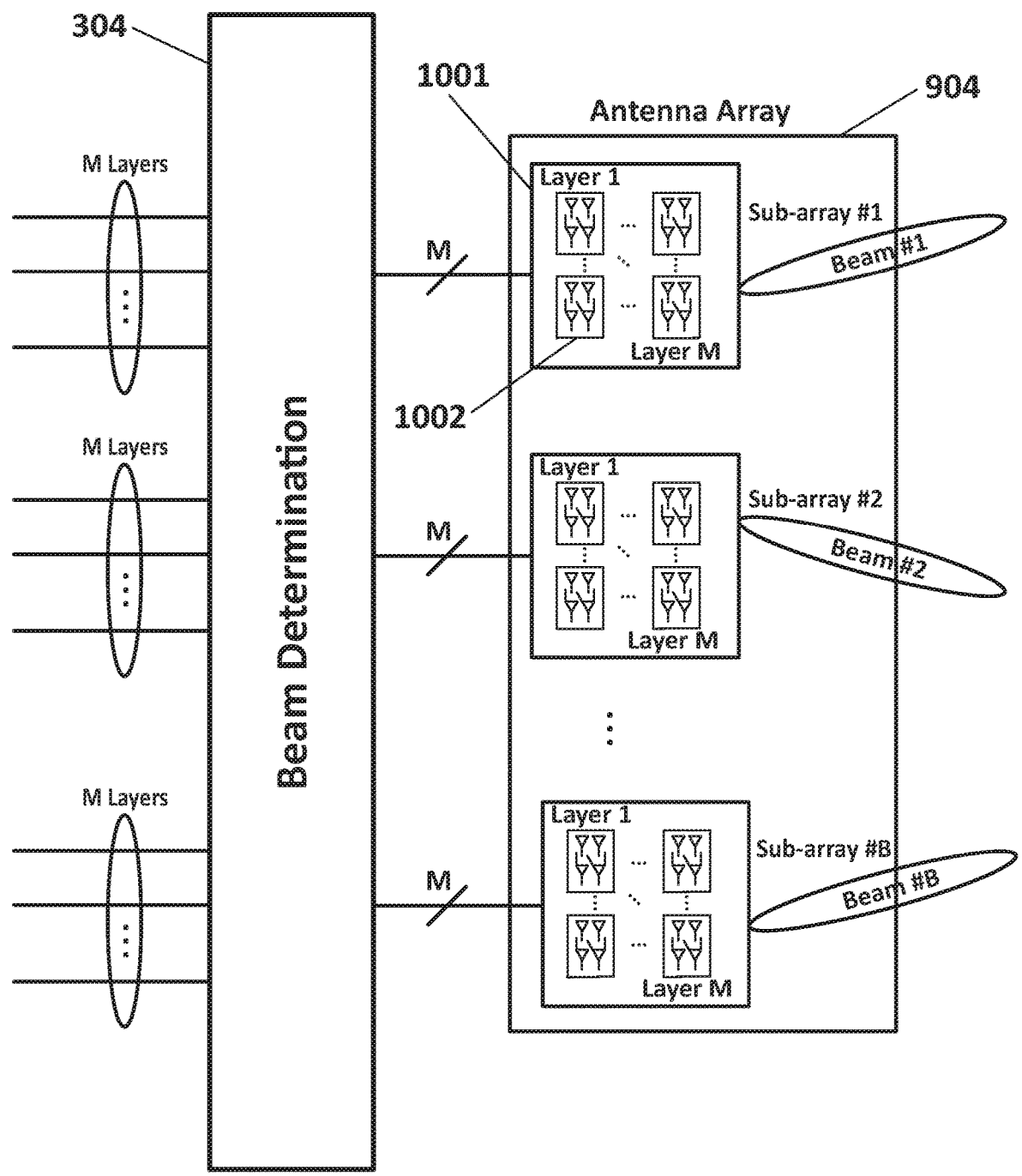
FIG. 15 illustrates another embodiment of the multi-beam antenna array with beam determination in uplink.

The arrangement shown in FIG. 15 illustrates an alternative embodiment, where B sub-arrays 1001 are associated to beams 103 statically steered towards the different directions in space (either mechanically or electrically). Each antenna sub-array 1001 contains (NIB)/M groups of antenna elements 1002, each suited to receive a spatial layer only in a specific direction in space corresponding to a beam 103. Each sub-array 1001 should allow simultaneous reception of as many spatial layers as allowed by the system. If MU-MIMO is not supported in uplink then only one beam 103 will have to be received at a time. Even in this case, several spatial layers might be received within a given beam 103 depending on the uplink MIMO capabilities of the CPE 102.

Irrespective of whether one or multiple spatial layers are sent by a CPE 102, the RF signals received by all the antennas 1002 in a group within an active sub-array 1001 can be combined and delivered to the baseband processor subsystem 301, which will either coherently combine the spatial layers to reinforce the signal quality or perform spatial de-multiplexing of the layers. The former can be achieved through e.g. Maximal Ratio Combining (MRC), or Interference Rejection Combining (IRC) techniques.

Referring back to FIG. 11, this figure shows an embodiment for the beam switching subsystem 303 with reference to the antenna array 904 of FIG. 9, where a radio resource scheduler is assumed to be supported by the base station 101. Assuming that the multi-beam antenna array 305 knows in advance the proper N×M phase shifts 901 to be applied for each beam 103 and spatial layer, M output ports will be delivered carrying the signals of the different spatial layers to the baseband processor subsystem 301.

Figure 16:
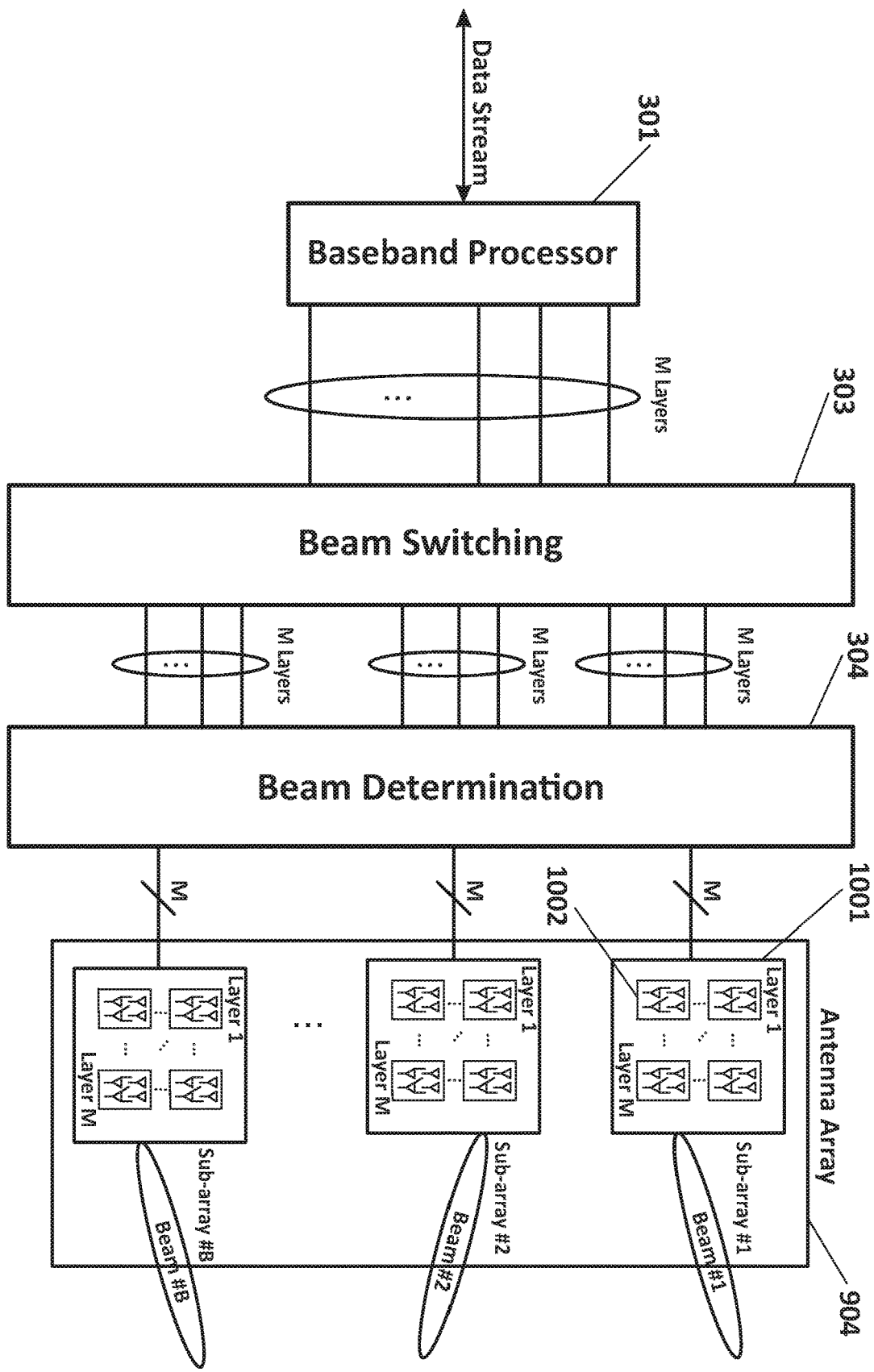
FIG. 16 illustrates an embodiment of the beam switching subsystem for uplink connections.

In another embodiment, shown in FIG. 16 with reference to the antenna array 904 in FIG. 15, B×M output ports from the different groups of antennas 1002 inside each sub-array 1001 reach the beam switching subsystem 303. If MU-MIMO is supported in uplink, or a radio resource scheduler is implemented, the system knows in advance which spatial layers and beams 103 are to be received. The baseband processor subsystem 301 then informs the beam switching subsystem 303 about which preferred beams 103 and spatial layers must be active at a given time. With this information, signals received from the M groups of antennas 1002 corresponding to the spatial layers involved inside the active beams are delivered to the baseband processor subsystem 301. If no MU-MIMO is supported in uplink and no scheduler is implemented, only one beam 103 is active at a time (although possibly with several spatial layers). The beam switching subsystem 303 then finds the beam 103 (the preferred beam for uplink connected mode) that best fits with the physical orientation of the CPE 102 by means of any suitable method.

The different embodiments described in the proposed invention can be implemented by means of software elements, hardware elements, firmware elements, or any suitable combination of them.

Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

As used herein, computer program products comprising computer-readable media including all forms of computer-readable medium except, to the extent that such media is deemed to be non-statutory, transitory propagating signals.

The foregoing descriptions are merely specific embodiments of the present invention, but are not intended to limit the protection scope of the present invention. The protection scope of the present invention shall be subject to the protection scope of the claims.

The invention claimed is:

1. A method to dynamically associate spatial layers to beams in a Fixed Wireless Access (FWA) network operating in a millimeter-wave frequency range, wherein a base station and at least one customer premises equipment (CPE) are configured to wirelessly transmit and receive data through a wireless channel of said FWA network, said base station having beamforming capabilities to generate multiple wireless beams, the method comprising:

performing, by the base station, all baseband wireless functions related for creating, keeping and managing connections between the base station and the at least one CPE at baseband level, wherein information is handled in a form of up to M spatial layer signals that are transmitted/received by a multi-beam antenna array of the base station and with no built-in capabilities for creation, detection or management of the beams;

performing, by the base station, all radio frequency (RF) functions at millimeter-wave frequencies, including beamforming and conversion from complex baseband signals to RF signals and vice versa, in such a way that a fully flexible association between spatial layers and beams is possible, to allow any spatial layer to be transmitted/received by any beam at a per-user level; and coupling, by the base station, the RF signals to said wireless channel and vice versa, wherein an initial access of the at least one CPE to the base station is handled by a baseband processor subsystem of the base station by:

sending, by the base station, beacon signals through available beams;

receiving, by the base station, a request from the at least one CPE that detects said beacon signals, requesting a connection to the base station through any of the available beams;

estimating, as a preferred beam, by the base station, a beam from which most energy is detected in uplink, and connecting a group of antenna elements involved in reception of said preferred beam to an input of an spatial layer of said baseband processor subsystem; and detecting, by the baseband processor subsystem, a user identification (user ID), corresponding to received uplink data, and associating the user ID to said preferred beam using a table that contains an association between active CPEs and beams throughout a lifetime of the connection.

2. The method of claim 1, wherein said user ID is a Medium Access Control (MAC) address of the at least one CPE.

3. The method of claim 1, wherein the baseband processor subsystem is configured to handle downlink transmissions to the at least one CPE, the at least one CPE being in connected mode, by first checking in the table the preferred beam corresponding to the user ID to be addressed, and then by forwarding a beam indicator to a beam switching subsystem at the base station, the beam switching subsystem being configured to, upon reception of said beam indicator, connect spatial layer signals involved in a downlink transmission with the group of antenna elements corresponding to said preferred beam.

4. The method of claim 1, wherein more than one CPE are active at the same time and the baseband processor subsystem is configured to handle downlink transmissions to active CPEs in connected mode by checking the preferred beam corresponding to each active CPE and by forwarding a beam indicator for each active CPE to a beam switching subsystem, the beam switching subsystem being configured to, upon reception of beam indicators, connect spatial layer signals involved in a downlink transmission with the group of antenna elements corresponding to each preferred beam.

5. The method of claim 1, wherein the baseband processor subsystem is configured to handle uplink transmissions from the at least one CPE, the at least one CPE being in connected mode, by:

based on the base station comprising a radio resource scheduler in charge of allocating radio resources to the at least one CPE, providing, by said baseband processor subsystem, at least one beam indicator to a beam switching subsystem at the base station in order to activate the preferred beam for uplink reception corresponding to the user ID included in the table, including an ability to activate more than one beam based on the base station supporting Multi-user-Multiple Input Multiple Output (MU-MIMO), and several CPEs located at different beams transmitting at the same time; or based on the base station not comprising the radio resource scheduler, detecting, by the base station, a preferred beam for uplink connected mode according to a physical location of the at least one CPE, and providing a beam indicator to the beam switching subsystem for connecting outputs from M groups of antennas corresponding to said preferred beam for uplink connected mode to the M spatial layer signals that are input to the baseband processor subsystem.

6. The method of claim 5, wherein said M spatial layer signals are either coherently combined by the baseband processor subsystem with Maximal Ratio Combining (MRC), or Interference Rejection Combining (IRC), to reinforce detection in a case of a single-layer transmission by the at least one CPE, or jointly decoded to perform spatial de-multiplexing of layers, in a case of a multi-layer transmission by the at least one CPE.

7. The method of claim 5, wherein said preferred beam for uplink connected mode is detected by:

detecting, by the base station, strongest energy at outputs of a plurality of Low-Noise Amplifiers (LNAs) of the M spatial layer signals, and assigning a beam detected with the strongest energy to the preferred beam for uplink connected mode;

obtaining, by the baseband processor subsystem, the user ID after decoding an uplink packet, and comparing the preferred beam stored in the table with the preferred beam for uplink connected mode; and discarding, by the baseband processor subsystem, said uplink packet based on a mismatch between the preferred beam for uplink connected mode and the preferred beam stored in the table for the same user ID.

8. The method of claim 7, wherein the beam switching subsystem is configured to, upon receiving the beam indicator, connect the outputs from the M groups of antennas corresponding to said preferred beam with the M spatial layer signals that are input to the baseband processor subsystem.

9. A system to dynamically associate spatial layers to beams in a Fixed Wireless Access (FWA) network operating in a millimeter-wave frequency range, said system comprising a base station and at least one customer premises equipment (CPE) configured to wirelessly transmit and receive data through a wireless channel of said FWA network, said base station having beamforming capabilities and configured to generate multiple wireless beams, wherein said base station comprises:

a baseband processor subsystem configured to perform all baseband wireless functions related to creating, keeping and managing connections between the base station and the at least one CPE at baseband level, wherein information is handled in a form of up to M spatial layer signals that are transmitted/received by a multi-beam antenna array of the base station, and with no built-in capabilities for creation, detection or management of the beams;

a radio-frequency (RF) frontend subsystem configured to perform all RF functions at millimeter-wave frequencies, including beamforming and conversion from complex baseband signals to RF signals and vice versa, in such a way that a fully flexible association between spatial layers and beams is possible, to allow any spatial layer to be transmitted/received by any beam at a per-user level;
said multi-beam antenna array configured to couple the RF signals to said wireless channel and vice versa, and comprising a collection of N antenna elements configured to transmit and receive in the millimeter-wave frequency range; and
a wireline backhaul link configured to connect the base station with a rest of the FWA network,
wherein said RF frontend subsystem comprises:
a beam switching subsystem configured to dynamically connect said M spatial layer signals to groups of antenna elements in uplink or downlink, in such a way that only groups of antenna elements corresponding to a beam in use for the at least one CPE are involved in transmission/reception of the signals to/from such CPE;
a beam determination hardware configured to detect uplink signals from the at least one CPE and to select which of groups of antenna elements corresponding to available beams are to be connected to said baseband processor subsystem for uplink reception,
wherein said beam switching subsystem comprises M RF switches configured to route the M spatial layer signals towards any of the available beams in downlink direction, wherein each RF switch has one input port corresponding to one spatial layer signal and B possible outputs, with a control input that depends on information stored in a table that contains an association between active CPEs and the beams throughout a lifetime of a connection.

10. The system of claim 9, wherein said FWA network comprises multiple cells, which are sub-divided into sectors, each sector being covered by at least one of said beams, and wherein each beam comprises a given beamwidth in an horizontal and/or vertical plane.

11. The system of claim 10, wherein said beams are statically steered along different orientations to cover an entire sector, by using phase shifters, microstrip transmission lines, mechanically-steered devices, or a technique capable of applying a progressive phase shift to the RF signals to be transmitted by the N antenna elements in said multi-beam antenna array.

12. The system of claim 9, wherein said multi-beam antenna array further comprises a collection of B sub-arrays configured to steer the RF signals along said beams, each sub-array having M groups of (N/B)/M antenna elements configured to handle transmission and/or reception of the M spatial layer signals.

13. A method to dynamically associate spatial layers to beams in a Fixed Wireless Access (FWA) network operating in a millimeter-wave frequency range, wherein a base station and at least one customer premises equipment (CPE) are configured to wirelessly transmit and receive data through a wireless channel of said FWA network, said base station having beamforming capabilities to generate multiple wireless beams, the method comprising:
performing, by the base station, all baseband wireless functions related for creating, keeping and managing connections between the base station and the at least one CPE at baseband level, wherein information is handled in a form of up to M spatial layer signals that are transmitted/received by a multi-beam antenna array of the base station and with no built-in capabilities for creation, detection or management of the beams;
performing, by the base station, all radio frequency (RF) functions at millimeter-wave frequencies, including beamforming and conversion from complex baseband signals to RF signals and vice versa, in such a way that a fully flexible association between spatial layers and beams is possible, to allow any spatial layer to be transmitted/received by any beam at a per-user level; and
coupling, by the base station, the RF signals to said wireless channel and vice versa,
wherein an initial access of the at least one CPE to the base station is handled by a baseband processor subsystem of the base station by:
sending, by the base station, beacon signals through available beams;
receiving, by the base station, a request from the at least one CPE that detects said beacon signals, requesting a connection to the base station through any of the available beams;
estimating, as a preferred beam, by a beam determination module at the base station, a beam from which most energy is detected in uplink, and connecting a group of antenna elements involved in reception of said preferred beam to an input of an spatial layer of said baseband processor subsystem; and
detecting, by the baseband processor subsystem, a user identification (user ID), corresponding to received uplink data, and associating the user ID to said preferred beam using a table that contains an association between active CPEs and beams throughout a lifetime of the connection.

* * * * *